(12) United States Patent
Endicott (10) Patent No.: US 7,243,024 B2
(45) Date of Patent: Jul. 10, 2007

(54) COMPUTER-IMPLEMENTED SYSTEM AND METHOD FOR WAYFINDING

(76) Inventor: William L. Endicott, 1209 Hilltop Ave., Wilmington, DE (US) 19809

( * ) Notice: Subject to any disclaimer, the term of this patent is extended or adjusted under 35 U.S.C. 154(b) by 610 days.

(21) Appl. No.: 10/215,758

(22) Filed: Aug. 9, 2002

(65) Prior Publication Data

US 2003/0033079 A1 Feb. 13, 2003

Related U.S. Application Data

(60) Provisional application No. 60/311,481, filed on Aug. 11, 2001.

(51) Int. Cl.
*G01C 21/00* (2006.01)

(52) U.S. Cl. .................. 701/206; 701/201; 701/209; 701/211; 340/995.16; 342/357.09

(58) Field of Classification Search ........ 701/117–218; 700/237–238, 264; 725/134, 142; 455/456.1, 455/412.1; 340/995.19, 691.1; 345/419
See application file for complete search history.

(56) References Cited

U.S. PATENT DOCUMENTS

| | | | |
|---|---|---|---|
| 4,275,274 A | | 6/1981 | English |
| 5,802,492 A * | | 9/1998 | DeLorme et al. ......... 455/456.5 |
| 5,848,373 A * | | 12/1998 | DeLorme et al. ........... 701/200 |
| 6,233,518 B1 * | | 5/2001 | Lee ............................ 701/117 |
| 6,266,614 B1 * | | 7/2001 | Alumbaugh ................ 701/211 |
| 6,278,938 B1 * | | 8/2001 | Alumbaugh ................ 701/208 |
| 6,320,496 B1 * | | 11/2001 | Sokoler et al. ........... 340/407.1 |
| 6,321,158 B1 * | | 11/2001 | DeLorme et al. ........... 701/201 |
| 6,647,328 B2 * | | 11/2003 | Walker ........................ 701/36 |
| 6,768,944 B2 * | | 7/2004 | Breed et al. ................ 701/301 |
| 7,085,637 B2 * | | 8/2006 | Breed et al. ................. 701/38 |
| 2001/0013189 A1 | | 8/2001 | Firth |
| 2002/0075507 A1 * | | 6/2002 | Owen ........................ 358/1.15 |
| 2002/0149491 A1 * | | 10/2002 | Crandall et al. ......... 340/691.1 |
| 2003/0182052 A1 * | | 9/2003 | DeLorme et al. ........... 701/201 |
| 2004/0218618 A1 * | | 11/2004 | Asami ........................ 370/432 |

OTHER PUBLICATIONS

Ramloll et al., Wayfinding in virgual environments using an interactive spatial cognitive map, 2001, IEEE, p. 574-583.*
Semwal, Wayfinding and navigation in haptic virtual environments, 2001, IEEE, p. 740-743.*

(Continued)

*Primary Examiner*—Thomas Black
*Assistant Examiner*—McDieunel Marc
(74) *Attorney, Agent, or Firm*—Connolly Bove Lodge & Hutz LLP (57) ABSTRACT

A computer-implemented wayfinding system and method, wherein the system includes an interconnected network of computer entities capable of transmitting and receiving audio and visual outputs and inputs to users in order to guide them through an environment. In one aspect of the wayfinding system, a series of kiosks are interconnected, with at least one kiosk being capable of printing a barcode that provides destination information inputted by the user. The kiosks may be located at designated locations of the environment, so that a user searching for his or her destination may scan their barcode, and the kiosk will provide audio and visual directions to the destination. The kiosks know their designated locations in the environment, and thus, may provide the most direct route to any other point in the environment.

17 Claims, 10 Drawing Sheets

OTHER PUBLICATIONS

Wernett et al., A framework for assisted exploration with collaboriation, 1999, IEEE, p. 241-248.*

J. Muhlhausen, *Wayfinding Is Not Signage*, http://www.signweb.com/ada/cont/wayfinding0800.html (printed on Jul. 19, 2002).

S. MacMinner, *Wayfinding: Human Perceptions & Orientation; in the Built Environment*, http://www.unl.edu/casetudy/456/sharon.html (printed on Jul. 19, 2002).

J. Boykin, *Wayfinding Signage*, http://www.quintessence5.com/wayfinding.html (printed on Jul. 19, 2002).

Dynamic Sign Systems, Ariadne,™ printout from http://www.asisignsystems.com/products/interior/dynamic/how.html (printed on May 28, 2002).

Product brochure for Navigo,™ *The Wayfinding Solution for Today's Hospital and Healthcare Facilities* (Copyright 2001 Interactive Touchscreen Solutions, Inc.).

Product brochure for Directory Solutions Innovative Directory Systems, *It's Time to Bring Your Building Directory Into the 21st Century!*(no publication date).

* cited by examiner

COMPUTER-IMPLEMENTED SYSTEM AND METHOD FOR WAYFINDING

CLAIM FOR PRIORITY

The present application claims priority of U.S. Provisional Patent Application Ser. No. 60/311,481, filed Aug. 11, 2001, the disclosure of which being incorporated by reference herein in its entirety.

BACKGROUND OF THE INVENTION

A. Field of the Invention

The present invention relates generally to wayfinding, and, more particularly to a computer-implemented system and method for wayfinding.

B. Description of the Related Art

When people are in unfamiliar environments (e.g., a building, a group of buildings, a campus, airport, etc.), they need to know where they are in the environment, the layout of the environment, and the location of their destination in order to formulate the best route to the destination. En route to their destinations, people are helped by physical wayfinding systems.

Wayfinding is essential in today's society. The term "wayfinding" was first used in 1960 by Kevin Lynch, The Image of the City, where he referred to maps, street numbers, directional signs and other elements as "wayfinding" devices. For example, U.S. Patent Application Publication No. 2001/0013189 A1 describes a hierarchical wayfinding system that is based solely upon signs or "signage."

Most conventional wayfinding systems implement some form of physical signage. This entails installing physical signs throughout locations of an environment and/or providing maps to guide individuals through an environment. Faulty sign detection can cause navigation problems in unfamiliar environments. Some signs lack visibility because letters are illegible when viewed from a distance. Some signs contain inaccurate, ambiguous, outdated, or unfamiliar information. Other signs are obscured or contain reflective surfaces, which hinder comprehension. Furthermore, much of the American population is either functionally illiterate or does not speak English. Consequently, many people don't read signs and it is often easier to ask for directions.

Conventional physical wayfinding systems are useful only if they are kept current. For example, floor plans or buildings, locations of offices, departments etc. all periodically change. Thus, an outdated wayfinding system would guide people through and to locations that may no longer exist. Unfortunately, the cost of keeping physical wayfinding systems current may be great. For example, signage may need to be physically removed, replaced, or eliminated, and, in the worst case, the entire wayfinding system may need to be redesigned.

The costs for providing verbal directions may be astronomical for a business. For instance, hospital personnel estimate that they spend a considerable amount of their time giving directions to people, which translates into lost work time for these people, time which could be spent saving lives or performing other tasks necessary for a functioning hospital.

Thus there is a need in the art to provide a wayfinding system that communicates in multiple languages and without languages, may be updated inexpensively and quickly, and provides easy to use directions in any environment.

BRIEF DESCRIPTION OF THE DRAWINGS

The accompanying drawings, which are incorporated in and constitute a part of this specification, illustrate various aspects of the present invention and together with the description, serve to explain the principles of the invention. In the drawings.

DESCRIPTION OF EMBODIMENTS OF THE PRESENT INVENTION

Reference will now be made in detail to the present embodiments of the present invention, examples of which are illustrated in the accompanying drawings. Wherever possible, the same reference numbers will be used throughout the drawings to refer to the same or like parts.

The present invention satisfies the needs of the related art by providing a computer-implemented system and method for wayfinding to single or multiple destinations in an environment. As used herein, the term "environment" applies to any building, group of buildings, hospital, campus, airport, amusement park, stadium, etc. where physical wayfinding systems may be used. The wayfinding system and method of the present invention is not limited to any particular environment, however, and may be used in any environment in need of a wayfinding system.

Generally, the wayfinding system of the present invention comprises an interconnected network of clients, servers, and/or client/servers capable of transmitting and receiving audio and visual outputs and inputs to users in order to guide them through an environment. In an exemplary aspect of the wayfinding system of the present invention, a series of kiosks are interconnected, with at least one kiosk being capable of printing a barcode that provides destination information inputted by the user. The kiosks may be located at designated locations of the environment, so that a user searching for his or her destination may simply scan their barcode with a kiosk, and the kiosk will provide audio and visual directions to the destination. The kiosks know their designated locations in the environment, and thus, may provide the most direct route to any other point in the environment.

The wayfinding system of the present invention may be updated almost instantaneously. When a location in an environment changes, e.g., an office or department moves to a different part of a building, the computer-implemented wayfinding system and method can be quickly and inexpensively reprogrammed to accommodate the change. There is no need to update expensive physical signage, as is the case with conventional wayfinding systems.

Additional advantages of the invention will be set forth in part in the description which follows, and in part will be learned from the description, or may be learned by practice of the invention. The advantages of the invention will be realized and attained by means of the elements and combinations particularly pointed out in the appended claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

A. Detailed Description of the Wayfinding System Hardware

Figure 1:
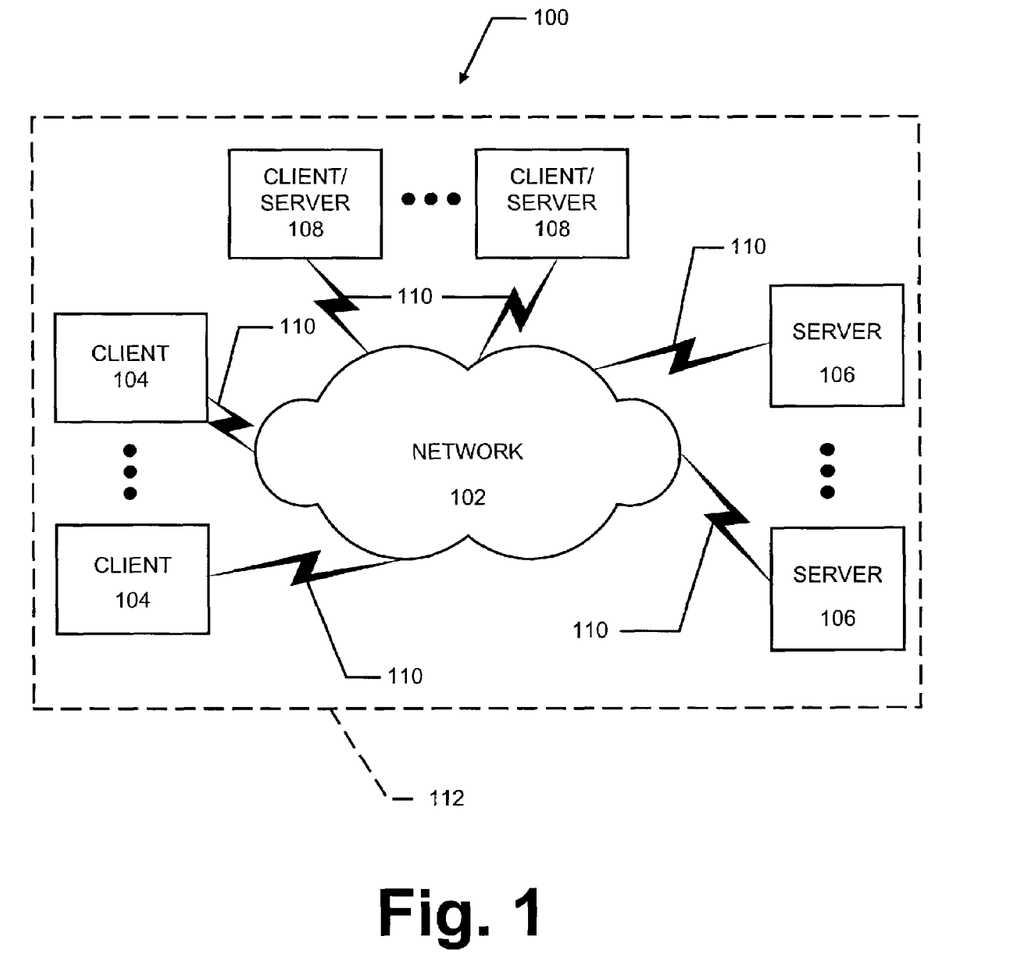
FIG. 1 is a schematic diagram showing a wayfinding system of the present invention.

In accordance with the invention and as shown in FIG. 1, the wayfinding system 100 of the present invention includes a network 102 that interconnects client entities 104, server entities 106 and/or client/server entities 108 via communication links 110, within an environment 112.

Network 102 may comprise an Internet, intranet, extranet, local area network (LAN), wide area network (WAN), metropolitan area network (MAN), telephone network such as the public switched telephone network (PSTN), or a similar network.

The Internet is a collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing protocols.

An intranet is a private network that is contained within an enterprise. It may consist of many interlinked local area networks and also use leased lines in the wide area network. Typically, an intranet includes connections through one or more gateway computers to the outside Internet. The main purpose of an intranet is to share company information and computing resources among employees. An intranet can also be used to facilitate working in groups and for teleconferences. An intranet uses TCP/IP, HTTP, and other Internet protocols and in general looks like a private version of the Internet. With tunneling, companies can send private messages through the public network, using the public network with special encryption/decryption and other security safeguards to connect one part of their intranet to another. Typically, larger enterprises allow users within their intranet to access the public Internet through firewall servers that have the ability to screen messages in both directions so that company security is maintained. When part of an intranet is made accessible to customers, partners, suppliers, or others outside the company, that part becomes part of an extranet.

An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company.

A LAN refers to a network where computing resources such as PCs, printers, minicomputers, and mainframes are linked by a common transmission medium such as coaxial cable. A LAN usually refers to a network in a single building or campus. A WAN is a public or private computer network serving a wide geographic area. A MAN is a data communication network covering the geographic area of a city, a MAN is generally larger than a LAN but smaller than a WAN.

PSTN refers to the world's collection of interconnected voice-oriented public telephone networks, both commercial and government-owned. It is the aggregation of circuit-switching telephone networks that has evolved from the days of Alexander Graham Bell. Today, PSTN is almost entirely digital in technology except for the final link from the central (local) telephone office to the user. In relation to the Internet, the PSTN actually furnishes much of the Internet's long-distance infrastructure.

An entity may include software, such as programs, threads, processes, information, databases, or objects; hardware, such as a computer, a laptop, a personal digital assistant (PDA), a wired or wireless telephone, or a similar wireless device; or a combination of both software and hardware. A client entity 104 is an entity that sends a request to a server entity and waits for a response. A server entity 106 is an entity that responds to the request from the client entity. A client/server entity 108 is an entity where the client and server entities reside in the same piece of hardware or software.

Connections or communication links 110 may be wired, wireless, optical or a similar connection mechanisms. "Wireless" refers to a communications, monitoring, or control system in which electromagnetic or acoustic waves carry a signal through atmospheric space rather than along a wire. In most wireless systems, radio-frequency (RF) or infrared (IR) waves are used. Some monitoring devices, such as intrusion alarms, employ acoustic waves at frequencies above the range of human hearing.

Figure 3:
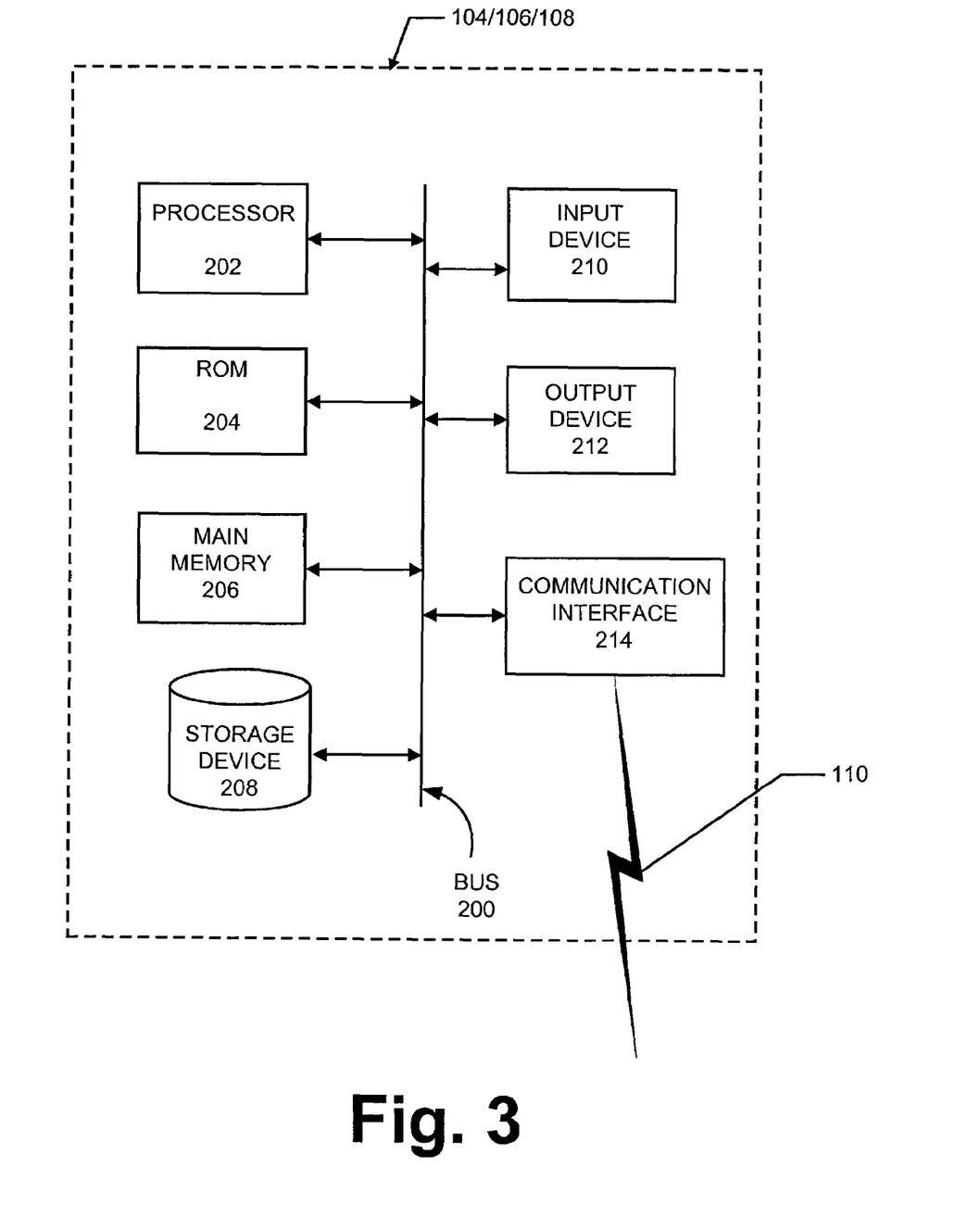
FIG. 3 is a schematic diagram showing a client, server, or client/server entity of the wayfinding system of FIG. 1.

As shown in FIG. 3, an entity, whether it be a client entity 104, a server entity 106, or a client/server entity 108, may include a bus 200 interconnecting a processor 202, a read-only memory (ROM) 204, a main memory 206, a storage device 208, an input device 210, an output device 212, and a communication interface 214. Bus 200 is a network topology or circuit arrangement in which all devices are attached to a line directly and all signals pass through each of the devices. Each device has a unique identity and can recognize those signals intended for it. Processor 202 includes the logic circuitry that responds to and processes the basic instructions that drive entity 104, 106, 108. ROM 204 includes a static memory that stores instructions and date used by processor 202.

Computer storage is the holding of data in an electromagnetic form for access by a computer processor. Main memory 206, which may be a RAM or another type of dynamic memory, makes up the primary storage of entity 104,106,108. Secondary storage of entity 104,106,108 may comprise storage device 208, such as hard disks, tapes, diskettes, Zip drives, RAID systems, holographic storage, optical storage, CD-ROMs, magnetic tapes, and other external devices and their corresponding drives.

Input device 210 may include a keyboard, mouse, pointing device, sound device (e.g. a microphone, etc.), biometric device, a touch-screen display, barcode scanner, or any other device providing input to entity 104, 106, 108. Output device 212 may comprise a display, a printer, a sound device (e.g. a speaker, etc.), or other device providing output from entity 104, 106, 108. Communication interface 214 may include network connections, modems, or other devices used for communications with other computer systems or devices.

Figure 2:
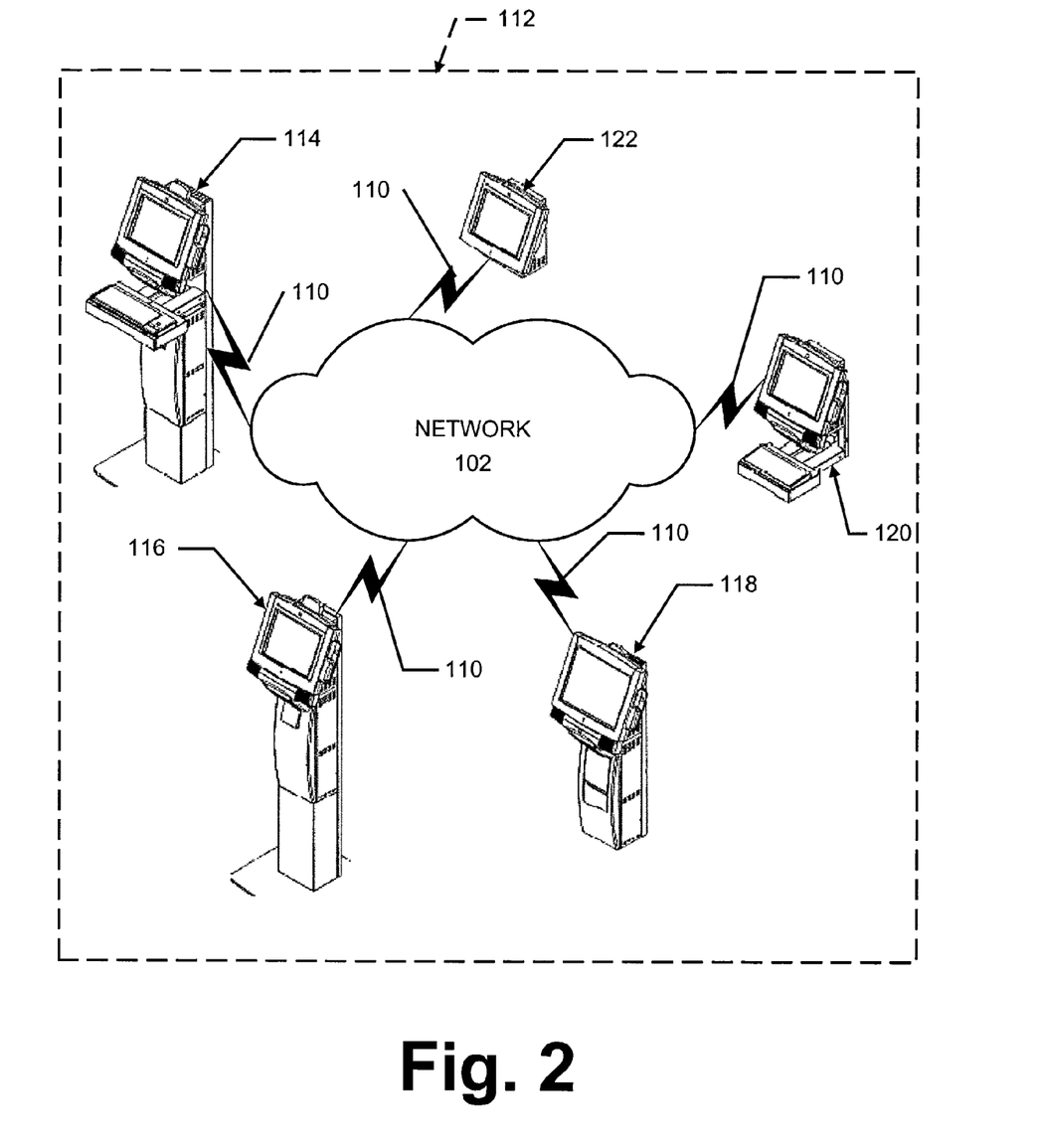
FIG. 2 is a schematic diagram of the wayfinding system shown in FIG. 1, and showing a variety of hardware that may be used for the client, server, and/or client/server entities of the wayfinding system.

In an exemplary aspect of the present invention and as shown in FIG. 2, each entity, whether it be a client entity 104, a server entity 106, or a client/server entity 108, may be a kiosk—a small physical structure, that includes a computer and a display screen, and displays information for people walking by. More preferably, each entity 104, 106, 108 may be a sophisticated kiosk that includes a touch screen, sound, and motion video. Kiosks come in a variety of styles and capabilities. Kiosks capable of use with the wayfinding system of the present invention include but are not limited to the following kiosks available from NCR Corporation: a pedestal-mount with self-service printer and attached keyboard kiosk 114; a pedestal-mount with self-service printer kiosk 116; a wall or pole mount with self-service printer kiosk 118; a post, wall, or pole-mount with keyboard kiosk 120; or a post, wall or pole-mount kiosk 122.

In the exemplary aspect, kiosks are interconnected via network 102, and are provided at locations within environment 112. By way of example only and not limiting of the present invention, at least one of the kiosks having a printer 114, 116, 118 may be provided at the main entrance of environment 112 (e.g., a hospital), while the remaining kiosks located throughout the hospital may be kiosks without printers 120, 122. In the hospital example, a patient or visitor to the hospital may enter at the main entrance, select a destination, and receive a barcode printout from kiosk 114, 116, 118. As the patient or visitor moves through the hospital, he or she need only scan the barcode printout with one of kiosks 114, 116, 118,120, 122,and kiosks 114, 116, 118, 120, 122 will provide directions to the destination.

In the exemplary aspect of the present invention, the wayfinding system of the present invention may include at least one kiosk having at least a barcode scanner and a touch screen display as input devices, and at least a printer capable of printing barcodes as an output device; while the remaining kiosks each may include at least a barcode scanner and a touch screen display as input devices. However, all of the kiosks may have a printer capable of printing barcodes as an output device.

As will be described more fully below, an entity 104, 106, 108 consistent with the present invention may perform a wayfinding system software application in accordance with the present invention. Entity 104, 106, 108 performs this task in response to processor 202 executing sequences of instructions contained in a computer-readable medium, such as main memory 206. A computer-readable medium may include one or more memory devices and/or carrier waves.

Execution of the sequences of instructions contained in main memory 206 causes processor 202 to perform processes that will be described later. Alternatively, hardwired circuitry may be used in place of or in combination with software instructions to implement processes consistent with the present invention. Thus, the present invention is not limited to any specific combination of hardware circuitry and software.

B. Detailed Description of the Wayfinding System Software

Below is described the general operation of the wayfinding software application of the present invention. The wayfinding software application described applies to a hospital-based wayfinding system. However, the wayfinding software application may be modified or customized for use with any environment, and is in no way limited to a hospital-based wayfinding system. The software tools described here are for exposition purpose only. Further software tools can be created by the user by combining parts of the software tools described herein.

Furthermore, the wayfinding software application is described as using a touch screen display that displays a graphical user interface, although the wayfinding software application may be used with other hardware and software configurations. To facilitate data manipulation, a touch screen display is preferably used as the data input device. A graphical user interface is a software program executed by an entity 104, 106, 108 that allows a user to manipulate data viewed on the display of entity 104, 106, 108. Each software tool described herein uses a graphical user interface for data manipulation.

A graphical user interface allows a user to interact with displayed data to change conditions or operations of the data. Preferably, the graphical user interface is user-friendly (e.g., Windows-based with icons and buttons) to allow the user to retrieve, manipulate, and display data effectively on entity 104, 106, 108 by simply selecting or controlling one or more icons or buttons using the touch screen display.

Although only visual information is conveyed in FIGS. 4–10, as described below, the wayfinding software application may provide audio instructions providing the same information as the visual information. This way the wayfinding system and software of the present invention is useful for people who are blind or illiterate.

Figure 4:
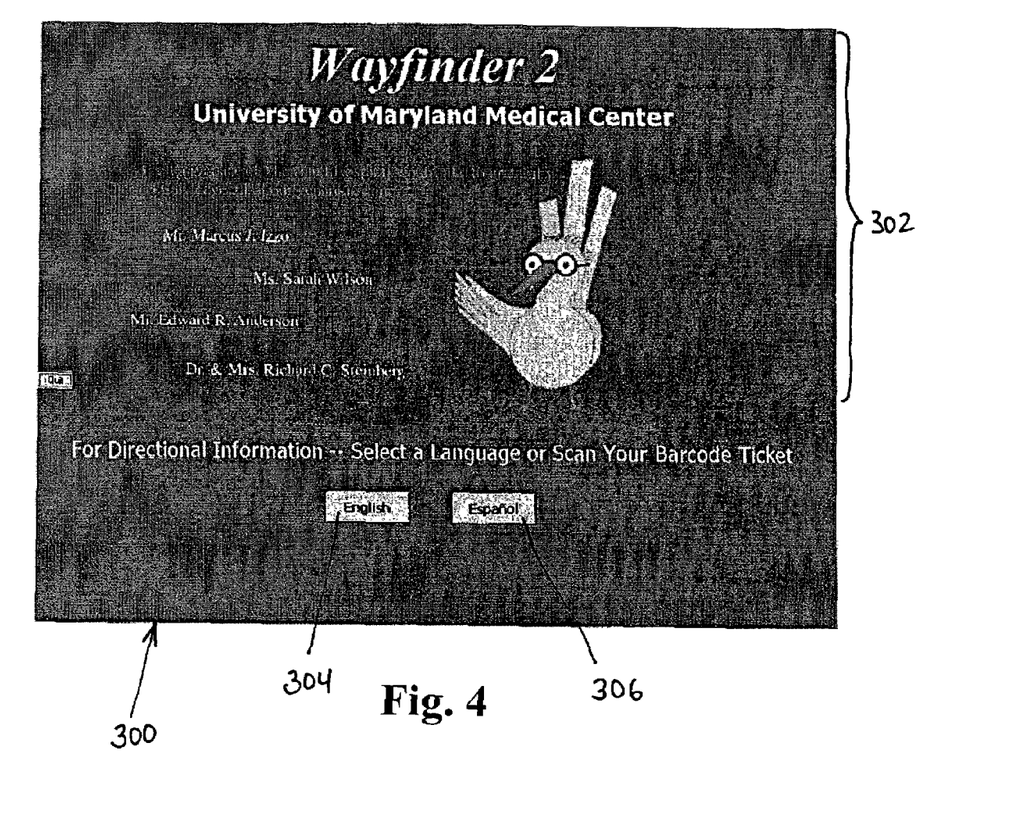
FIG. 4 is a screen shot showing a main screen of a wayfinding software application of the present invention that is capable of being performed by a client, server, or client/server entity shown in FIG. 3.

For example, as shown in FIG. 4, a graphical user interface displays a main screen 300 of the wayfinding software application of the present invention. Main screen 300 may include a section 302 providing welcome or general information to a visitor or patient (hereinafter "user") of the hospital. Promotional, honorarium, etc. materials may also be provided in section 302, as desired. For directional information, main screen 300 also requests that the user select a language or scan a barcode ticket. Although only an English button 304 and an Español button 306 are displayed in FIG. 4, the wayfinding software application may be programmed to work with any type of language.

By way of example only, if the user touches the English button 304, all of the audio and visual instructions and directions outputted by the wayfinding software application will be outputted in the English language. If the user touches the Español button 306, all of the audio and visual instructions and directions outputted by the wayfinding software application will be outputted in Spanish.

Alternatively, if the user has scheduled an appointment for a certain doctor or department of the hospital, the hospital may mail the user a barcode ticket providing directional information to the user, prior to the user's arrival at the hospital. When the user arrives at the hospital, he or she need only scan the pre-mailed barcode ticket at barcode scanner (input device 210) of the kiosk (entity 104, 106, 108), and the wayfinding software application will automatically provide directional information (e.g., the location of the doctor or department where the appointment is scheduled) to the user, similar to the information shown in FIG. 8.

Figure 5:
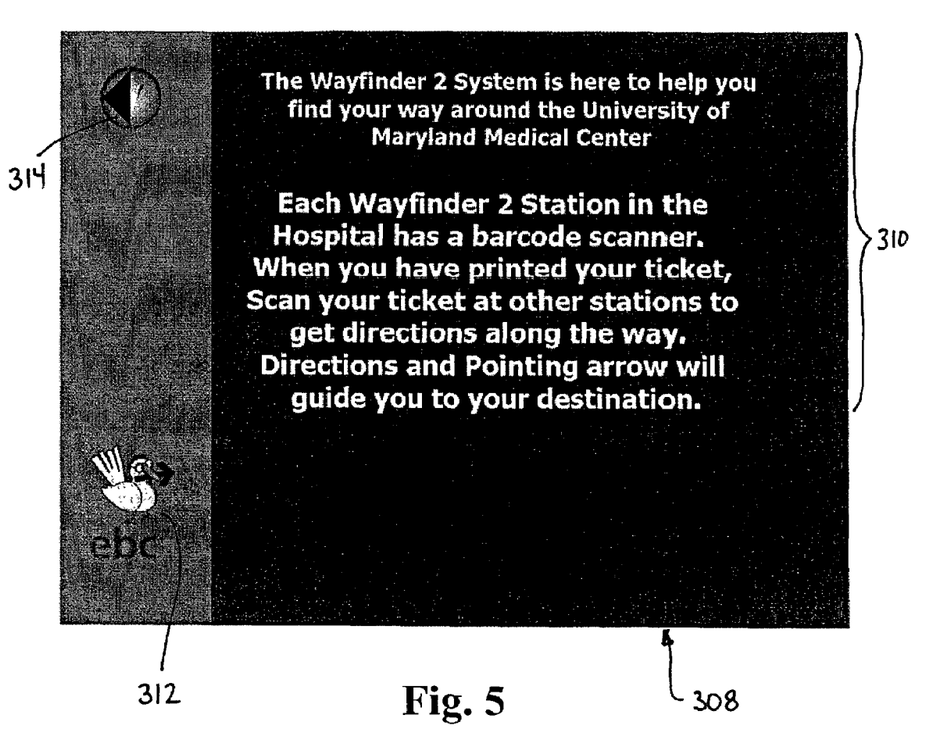
FIG. 5 is a screen shot of an explanation screen describing how the wayfinding software application of the present invention operates.

Whether the user selects a language or scans a pre-mailed barcode ticket, the wayfinding software application of the present invention displays an explanation screen 308 as shown in FIG. 5. Explanation screen 308 may provide text information, such as for example the following: "Each Wayfinder 2 Station in the Hospital has a barcode scanner. When you have printed your ticket, scan your ticket at other stations to get directions along the way. Directions and pointing arrow will guide you to your destination." Explanation screen 308 also provides an icon 314 that enables the user to return to the previous screen, and a help icon 312. Help icon 312 provides audio help information regarding the screen that is currently being displayed.

Figure 6:
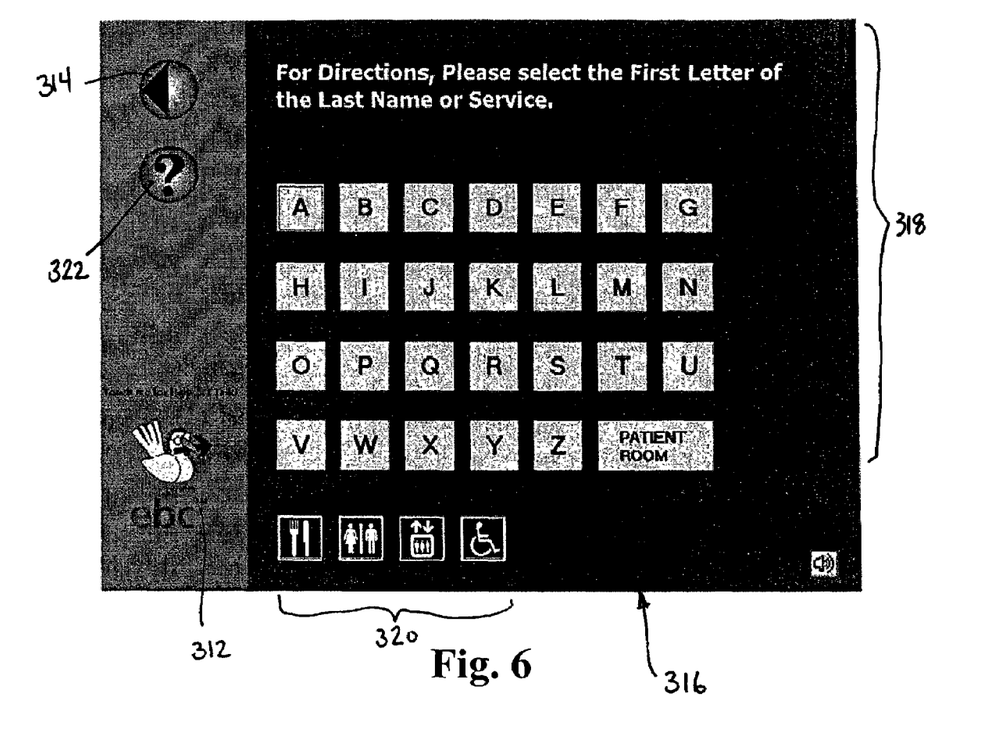
FIG. 6 is a screen shot of a destination menu screen of the wayfinding software application of the present invention.
Figure 7:
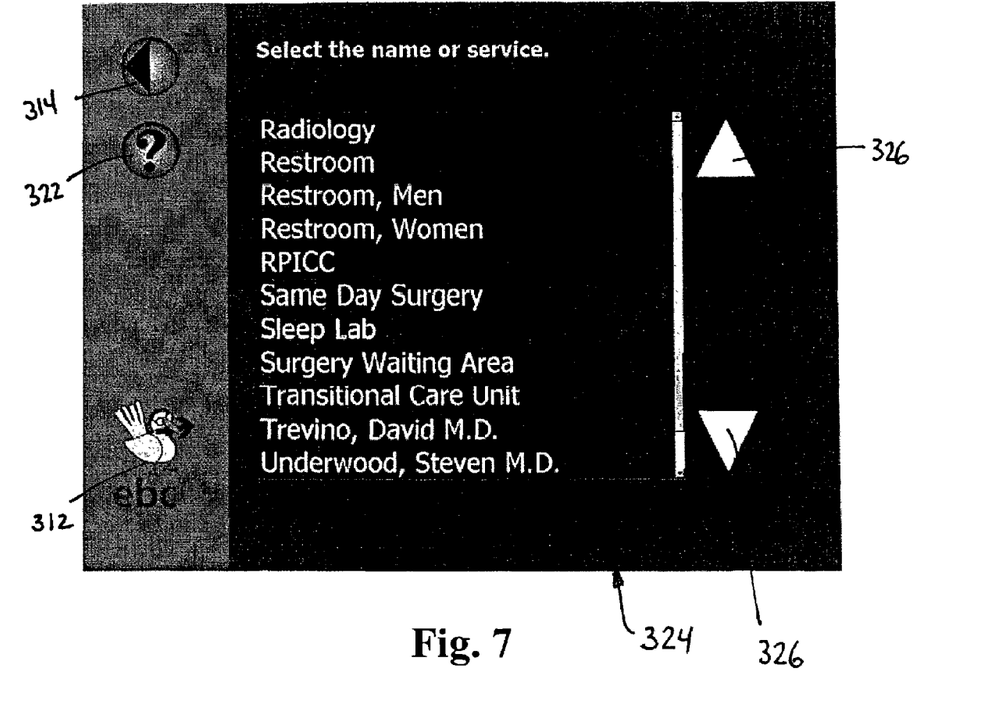
FIG. 7 is a screen shot of a detailed destination menu screen of the wayfinding software application of the present invention.

After the explanation screen 308 is displayed, the wayfinding software application displays a destination menu screen 316, as shown in FIG. 6. One section 318 of destination menu screen 316 provides buttons for each letter of the alphabet, and instructs the user to select the first letter of the Last Name or Service to where they would like directions. Section 318 also provides a button for PATIENT ROOM which enables the user to input and receive directions to a specific room number for a patient. Destination menu screen 316 also includes a section 320 having shortcut buttons that may be selected to provide directional information to locations for food (as represented by the fork and knife button), restrooms (as indicated by the male/female button), elevators (as represented by the people in the square button), and wheelchair access (as indicated by wheelchair button). Section 320 may also include shortcut buttons for promotional services or sponsors, such as hotels, restaurants, etc. Destination menu screen 316 further includes a question mark button 322 that provides visual (text) help information regarding the screen that is currently being displayed.

For exemplary purposes, suppose the user wanted to find the Radiology department in a hospital. The user would simply depress the "R" button on the destination menu screen 316, and the detailed destination menu screen 324 shown in FIG. 7 would be displayed. The detailed destination menu screen 324 displays all of the people or departments beginning with the letter "R" in alphabetical order. The user can scroll up or down through the list of people or departments by using the arrow buttons 326, until "Radiology" is displayed.

Figure 8:
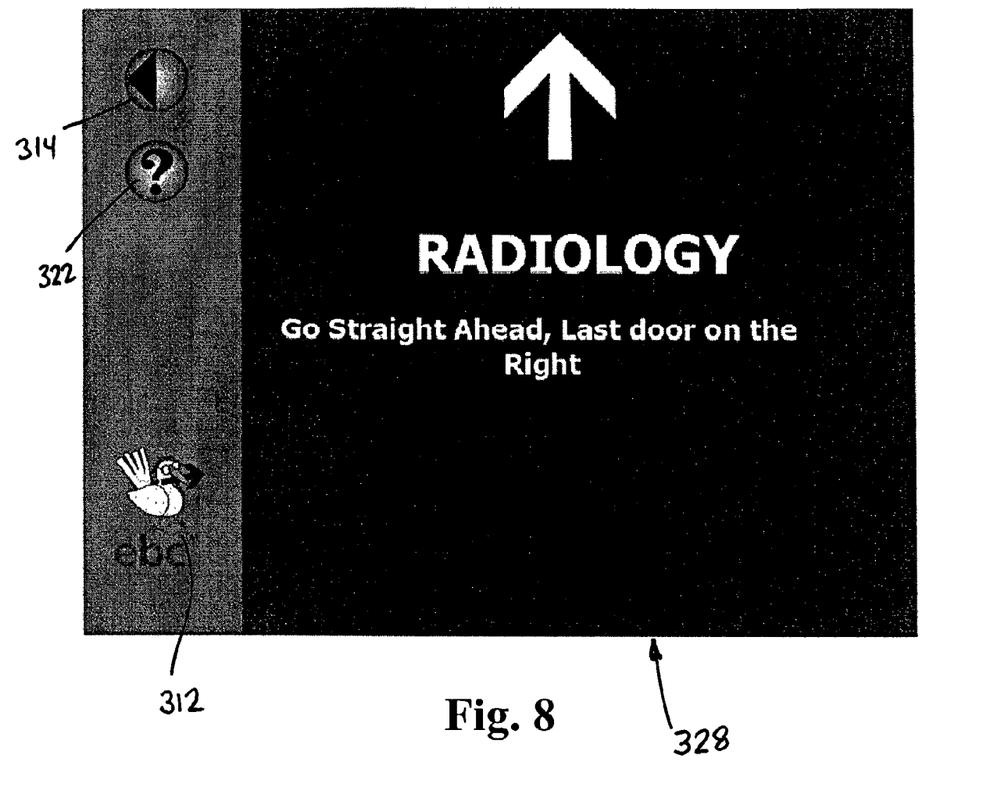
FIG. 8 is a screen shot of a directional screen of the wayfinding software application of the present invention.

In order to receive directional information to "Radiology," the user selects (touches) the word "Radiology" and the directional screen 328 shown in FIG. 8 is displayed. The directional screen 328 provides an arrow indicating the direction to Radiology, as well as detailed audio and visual directions to Radiology.

Figure 9A:
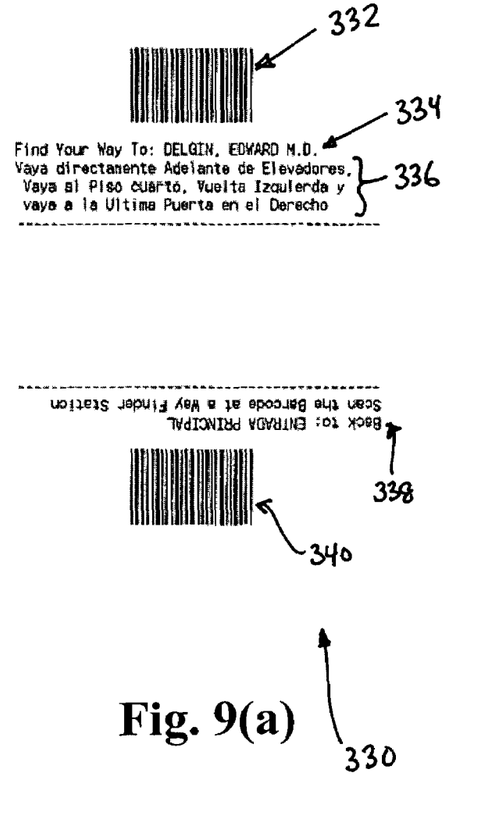
FIGS. 9(a) and 9(b) are sample barcodes (in Spanish and English, respectively) capable of being printed by the wayfinding software application of the present invention, and being used by the wayfinding system shown in FIGS. 1–3.
Figure 9B:
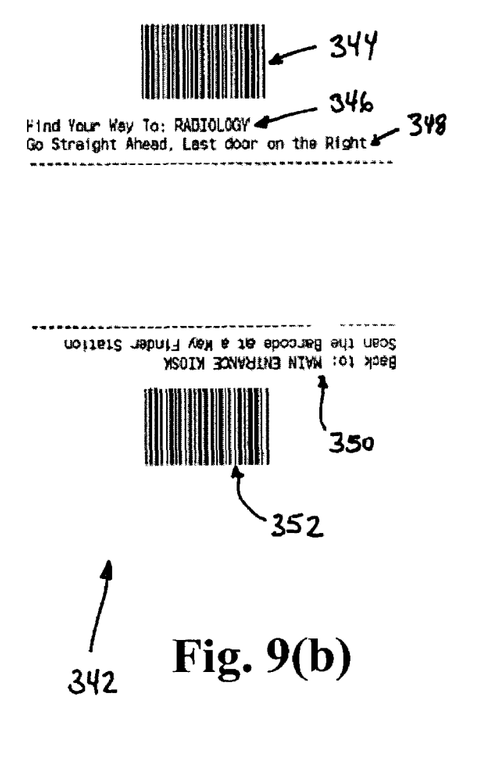

As the directional screen 328 is being displayed, the printer (output device 212) of the wayfinding system entity 104, 106, 108 (kiosk) prints a barcode ticket providing text directions to Radiology, as well as barcode directions to Radiology. FIGS. 9(a) and 9(b) show sample barcodes (in Spanish 330 and English 342, respectively) capable of being printed by the wayfinding system printer. As shown in FIG. 9(a), the Spanish barcode ticket 330 includes barcode directions 332, destination information 334, text directions 336, point of origin information 338, and barcode point of origin information 340. Similarly, as shown in FIG. 9(b), the English barcode ticket 342 includes barcode directions 344, destination information 346, text directions 348, point of origin information 350, and barcode point of origin information 352.

Barcode tickets 330, 342 may be carried with the user throughout the hospital, and be scanned at other barcode scanners (input devices 201) of wayfinding system entities 104, 106, 108 (kiosks) to provide updated directional information to the user. This way if the user makes a wrong turn and gets lost, the wayfinding system and software of the present invention quickly and easily enables the user to find their way to their destination, without the need to ask directions. After the user visits his or her destination, the barcode point of origin information 340,352 may be scanned by the user at wayfinding system entities 104, 106, 108 (kiosks) to provide directional information to where a user entered an environment 112 (e.g., a hospital entrance, parking garage, etc.).

Figure 10:
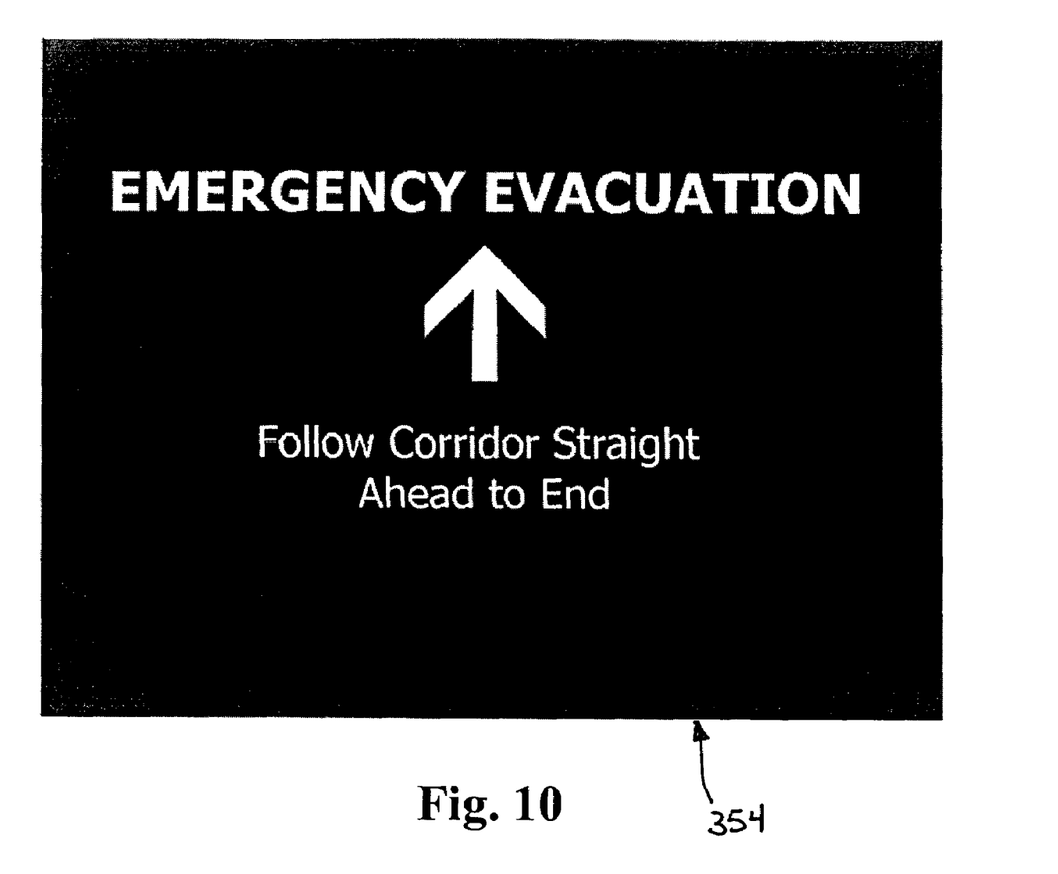
FIG. 10 is a screen shot of an emergency evacuation screen that may be displayed by wayfinding software application of the present invention.

Another useful application of the wayfinding software application is the provision of emergency evacuation information on all entities 104, 106, 108 to aid evacuation of an environment 112, such as a building. FIG. 10 shows an exemplary directional emergency evacuation screen 354 that may be displayed by the wayfinding software application of the present invention. In the event of an emergency (e.g., fire, earthquake, bioterrorism, etc.), all of the entities 104, 106, 108 will display directions to the nearest exit or the nearest exit away from the danger (e.g., if a fire has blocked certain exits), or will provide information as to where different emergency teams are to assemble in the event of an emergency. Such features prevent mass confusion in the event of emergency.

It will be apparent to those skilled in the art that various modifications and variations can be made in the computer-implemented wayfinding system and method of the present invention and in construction of this system and method without departing from the scope or spirit of the invention. As an example, the barcode tickets discussed above may be replaced with other recognition devices, such as mechanical devices (e.g., a key, etc.), electrical devices (e.g., an access card with a programmable magnetic strip or integrated circuit chip, etc.).

The wayfinding system and method of the present invention may also be used for purposes other than wayfinding. For example, the wayfinding system and method may provide information (e.g., cafeteria menu, messages, etc.) to personnel who work in an environment. In the case of a hospital, personnel may use their hospital badges with the barcode scanner and be provided with information useful to them in their jobs.

Finally, in addition to audio and visual capabilities, the entities 104, 106, 108 of the wayfinding system of the present invention may also be provided with tactile communication devices such as raised letters, Braille, etc.

The computer-implemented wayfinding system and method of the present invention provides many benefits. For example, the wayfinding system and method: is easy to learn and use; provides a personal, virtual directional sign, non-essential information need not be sorted through; enables users to access directions to all departments (buildings, locations, etc.) from each entity 104, 106, 108 (kiosk); eliminates the need for maps; provides the user with information that no person can (e.g., where the user entered a building or parked the car); supplements existing physical wayfinding or signage systems, making them more effective; provides immediate changes and updates when departments or personnel are added, deleted, or relocated; reduces the need for personnel to give directions, freeing them up to perform their assigned tasks; complies with the ADA (Americans with Disabilities Act); prevents people from getting lost, reducing stress and improving visitor satisfaction, confidence, and well-being; instantly communicates life safety and security issues by providing exact evacuation information; communicates information to personnel; provides marketing opportunities for sponsors; and provides donor information and recognition.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for wayfinding, comprising the steps of:
   providing at locations within an environment a plurality of interconnected computer entities capable of transmitting and receiving audio or visual inputs to a user; and
   guiding the user to a specific destination within the environment by providing on at least one of the plurality of interconnected computer entities:
      directional information in a language of choice;
      a menu of destinations within the environment from which the user may select the specific destination;
      detailed audio or visual directions to the specific destination; and
      a barcode printout of directions to the specific destination.

2. A computer-implemented method for wayfinding as recited in claim 1, wherein the menu of destinations comprises an alphabetical listing of destinations within the environment from which the user may select the specific destination.

3. A computer-implemented method for wayfinding as recited in claim 1, wherein the detailed audio or visual directions to the specific destination includes a directional arrow and text and audio directions to the specific destination.

4. A computer-implemented method for wayfinding as recited in claim 1, wherein the barcode printout provides directions to the specific destination and point of origin information in text and barcode format.

5. A computer-implemented method for wayfinding as recited in claim 1, wherein said guiding step comprises providing evacuation information on the plurality of interconnected computer entitics to safely guide the user out of the environment.

6. A computer-implemented method for wayfinding, comprising the steps of:
   providing at locations within an environment a plurality of interconnected computer entities capable of transmitting and receiving audio or visual inputs and outputs to a user; and
   guiding the user to a specific destination within the environment by
   scanning a barcode printout of direction to the specific destination at at least one of the plurality of interconnected computer entities; and
   providing detailed audio or visual directions to the specific destination on at least one of the plurality of interconnected computer entities.

7. A system for wayfinding, comprising:
   a plurality of interconnected computer entities capable of transmitting and receiving audio or visual inputs and outputs to a user, the plurality of interconnected computer entities being provided at locations within an environment, each computer entity having a memory configured to store instructions and a processor configured to execute instructions, wherein the processor of each computer entity is further configured to execute instructions for providing: directional information in a language of choice;
   a menu of destinations within the environment from which the user may select the specific destination;
   detailed audio or visual directions to the specific destination;
   a barcode printout of direction to the specific destination; and
   guiding the user to a specific destination within the environment with the audio or visual inputs and outputs of the plurality of interconnected computer entities.

8. A system for wayfinding as recited in claim 7, wherein in response to the scanning of a barcode printout of direction to the specific destination with each of computer entity, the processor of each computer entity is further configured to execute instructions for providing detailed audio or visual directions to the specific destination.

9. A system for wayfinding as recited in claim 7, wherein the menu of destinations comprises an alphabetical listing of destinations within the environment from which the user may select the specific destination.

10. A system for wayfinding as recited in claim 7, wherein the detailed audio or visual directions to the specific destination includes a directional arrow and text and audio directions to the specific destination.

11. A system for wayfinding as recited in claim 7, wherein the barcode printout provides directions to the specific destination and point of origin information in text and barcode format.

12. A computer readable medium that stores instructions executable by at least one processor to perform a method for wayfinding, the instructions comprising:
   instructions for guiding a user to a specific destination within an environment with audio or visual inputs and outputs, wherein the instructions for guiding comprise:
      instructions for providing information in a language of choice;
      instructions for providing a menu of destinations within the environment from
      which the user may select the specific destination;
      instructions for providing detailed audio and visual directions to the specific destination; and
      instructions for providing a barcode printout of directions to the specific destination.

13. A computer readable medium as recited in claim 12, wherein the instructions for guiding comprise instructions for providing detailed audio or visual directions to the specific destination in response to the scanning of a barcode printout of directions to the specific destination with at least one of a plurality of interconnected computer entities.

14. A computer readable medium as recited in claim 12, wherein the menu of destinations comprises an alphabetical listing of destinations within the environment from which the user may select the specific destination.

15. A computer readable medium as recited in claim 12, wherein the detailed audio or visual directions to the specific destination includes a directional arrow and text or audio directions to the specific destination.

16. A computer readable medium as recited in claim 12, wherein the barcode printout provides directions to the specific destination and point of origin information in text and barcode format.

17. A computer readable medium as recited in claim 12, wherein the instructions for guiding comprise instructions for providing evacuation information on the plurality of interconnected computer entities to safely guide the user out of the environment.

* * * * *